(12) United States Patent
Manzoori et al.

(10) Patent No.: US 9,920,643 B2
(45) Date of Patent: Mar. 20, 2018

(54) DISTRIBUTOR DEVICE FOR COOLING AIR WITHIN AN ENGINE

(71) Applicant: ROLLS-ROYCE PLC, London (GB)

(72) Inventors: Reza Manzoori, Derby (GB); Julian Glyn Balsdon, Bristol (GB)

(73) Assignee: ROLLS-ROYCE plc, London (GB)

( * ) Notice: Subject to any disclaimer, the term of this patent is extended or adjusted under 35 U.S.C. 154(b) by 266 days.

(21) Appl. No.: 14/696,806

(22) Filed: Apr. 27, 2015

(65) Prior Publication Data

US 2015/0330238 A1     Nov. 19, 2015

(30) Foreign Application Priority Data

May 14, 2014    (GB) .................................. 1408543.5

(51) Int. Cl.
    *F01D 9/06*        (2006.01)
    *F01D 11/24*      (2006.01)
    *F02C 7/18*        (2006.01)

(52) U.S. Cl.
    CPC ............... *F01D 9/065* (2013.01); *F01D 9/06* (2013.01); *F01D 11/24* (2013.01); *F02C 7/18* (2013.01); *Y02T 50/675* (2013.01)

(58) Field of Classification Search
None
See application file for complete search history.

(56) References Cited

U.S. PATENT DOCUMENTS

| | | | |
|---|---|---|---|
| 3,529,941 A | 9/1970 | Tobiassen et al. | |
| 5,224,818 A | * 7/1993 | Drerup | F01D 5/187 |
| | | | 415/115 |
| 5,239,816 A | * 8/1993 | Holt, III | F01D 9/02 |
| | | | 60/39.53 |

(Continued)

FOREIGN PATENT DOCUMENTS

| | | |
|---|---|---|
| EP | 1074694 A2 | 2/2001 |
| EP | 2101041 A2 | 9/2009 |
| WO | 2014105269 A2 | 7/2014 |

OTHER PUBLICATIONS

Dec. 11, 2014 Search Report issued in British Application No. GB1408543.5.

(Continued)

*Primary Examiner* — Woody Lee, Jr.
*Assistant Examiner* — Theodore Ribadeneyra
(74) *Attorney, Agent, or Firm* — Oliff PLC (57) ABSTRACT

A distributor device for distributing cooling air within a gas turbine engine, the device including a base mountable adjacent an inlet for air to be distributed; and a deflector supported by the base and in fluid communication with the air inlet, the deflector being configured to direct air from the air inlet in a plurality of directions within the engine; wherein the deflector includes one or more deflecting surfaces curvilinearly configured to direct the air differentially in a plurality of desired directions within the engine. In embodiments the deflecting surface(s) is/are curved and are so configured such that air from the air inlet is directable (Continued)

either: (i) in directions of travel in each of a plurality of desired different, non-parallel directions within the engine; or (ii) in each of a plurality of desired different directions within the engine with different flow rates.

13 Claims, 8 Drawing Sheets

(56) References Cited

U.S. PATENT DOCUMENTS

| | | | |
|---|---|---|---|
| 6,578,462 B1* | 6/2003 | Franchino | F41A 21/36 89/14.2 |
| 7,108,479 B2* | 9/2006 | Beverley | F01D 5/187 415/115 |
| 8,100,633 B2* | 1/2012 | Propheter-Hinckley | F01D 9/065 415/115 |
| 2003/0068223 A1* | 4/2003 | Nikkanen | F01D 9/065 415/144 |
| 2005/0089393 A1* | 4/2005 | Zatorski | F01D 5/081 415/115 |
| 2005/0155989 A1* | 7/2005 | Vaynshteyn | G03G 15/0855 222/460 |
| 2012/0087784 A1 | 4/2012 | Widener | |
| 2014/0013767 A1* | 1/2014 | Bohney | F02C 6/08 60/785 |
| 2014/0212281 A1 | 7/2014 | Beach | |

OTHER PUBLICATIONS

"Spine (definition)," Oxford English Dictionary, second edition, Jan. 1, 1989, [http://www.oed.com/oed2/00233467].

Sep. 28, 2015 Search Report issued in European Patent Application No. 15 16 5171.

* cited by examiner

DISTRIBUTOR DEVICE FOR COOLING AIR WITHIN AN ENGINE

TECHNICAL FIELD

This invention relates to a distributor device for engine cooling air. More particularly the invention relates to a distributor device for distributing and/or directing cooling air within an engine, especially a gas turbine engine.

BACKGROUND

The advent of modern turbofan engines saw the introduction of a fundamental change in 3-shaft engine architecture, namely a change to a single skin high pressure (HP) turbine. The 3-shaft engine architecture requires three separate compressor offtakes to feed different temperature cooling air to each of the three turbines. In prior engines concentrically mounted cases have been used to achieve the separation and transfer of the three compressor cooling air flows.

One consequence of the change to a single skin casing has been the need to transport HP3 cooling air from the HP compressor to the HP turbine via large bore pipes routed around the outside of the engine core. The HP3 air delivery pipework into the intermediate pressure (IP) turbine is typically routed onto bosses on the HP-IP case. Owing to the circumferential locations of bearing support structural mount points and oil and air service pipes, this means that the high pressure air is typically directed straight onto the inter-platform gaps of the IP nozzle guide vane (NGV) outer platforms immediately below the bosses.

This system has various disadvantages. For instance:
There is uneven distribution of the cooling air, leading to localised hot spots and accompanying hardware deterioration.
In some arrangements where modulated HP3 air flow is introduced into the engine via independently controllable valves arranged in the HP3 air delivery system, the modulated and non-modulated air pipes may not be interspersed symmetrically, which results in over half the circumference of some of the pipes not receiving direct HP3 air input.
The current system encourages leakage flow of air past strip seals which are typically located between the IP NGV's by the blowing of cooling HP3 air straight onto them.
It also encourages heat pickup from the gaspath components owing to the airflow's direct impinging thereon. This can lead to deterioration of downstream components due to the delivery thereto of higher temperature cooling air.
It also encourages thermal cracking of gaspath components owing to the introduction of localised high thermal gradients.

An example of one prior attempt at improving cooling air flow distribution within a gas turbine engine manifold is disclosed in U.S. Pat. No. 8,100,633B2 (United Technologies Corp.). The arrangements disclosed there involve the use of splash plates to direct radially incoming air from a cooling air conduit such that at least some of the cooling air spreads circumferentially within the manifold. However, these known splash plate arrangements are of only limited efficacy in providing improved cooling airflow distribution, and many, if not all, of the above-mentioned problems still remain to some degree.

Other distribution devices are described in U.S. Pat. No. 3,529,941, US2014212281, U.S. Pat. No. 5,239,816, EP1074694 and US2012087784.

SUMMARY OF THE INVENTION

It is thus a primary object of the present invention to provide an engine cooling air distribution system which ameliorates or at least partially solves at least some of the above-mentioned problems associated with known engine cooling air distribution systems.

The present invention provides a distributor device for distributing cooling air within an engine in accordance with the appended claims.

Aspects of the present invention relate to a distributor device for distributing cooling air within an engine, an engine manifold comprising the distributor device, an engine comprising the distributor device, a method of distributing cooling air within an engine using the distributor device, and a deflector element for use in forming the distributor device.

In a first aspect there is provided a distributor device for distributing cooling air within a gas turbine engine, the device comprising:
  a base mountable adjacent an inlet for air to be distributed; and
  a deflector supported by the base in fluid communication with the air inlet, the deflector being configured to direct air from the air inlet in a plurality of directions within the engine;
  wherein the deflector comprises one or more deflecting surfaces curvilinearly configured to direct the said air differentially in a plurality of desired directions within the engine characterised in that: the deflector is supported by the base via a spine which is located within the air inlet.

As used herein the term "differentially" as applied to the directing of the air from the air inlet preferably means directing the air with differing parameters of (i) direction of travel in each of a plurality of desired different, non-parallel directions, or (ii) different flow rates in each of a plurality of desired different directions, or (iii) a combination of (i) and (ii).

Thus the deflector of the device may comprise one or more deflecting surfaces which are curved and so configured such that air from the air inlet is directable in accordance with one or more differing parameters selected from: (i) in directions of travel in each of a plurality of desired different, non-parallel directions, or (ii) with different flow rates in a plurality of desired different directions, or (iii) a combination of (i) and (ii).

Accordingly, there may be a distributor device for distributing cooling air within a gas turbine engine, the device comprising:
  a base mountable adjacent an inlet for air to be distributed; and
  a deflector supported by the base and in fluid communication with the air inlet, the deflector being configured to direct air from the air inlet in a plurality of directions within the engine;
  wherein the deflector comprises one or more deflecting surfaces curvilinearly configured to direct the said air in directions of travel in each of a plurality of desired different, non-parallel directions within the engine.

Accordingly, there may be a distributor device for distributing cooling air within a gas turbine engine, the device comprising:

a base mountable adjacent an inlet for air to be distributed; and a deflector supported by the base and in fluid communication with the air inlet, the deflector being configured to direct air from the air inlet in a plurality of directions within the engine;

wherein the deflector comprises one or more deflecting surfaces curvilinearly configured to direct the said air in each of a plurality of desired different directions within the engine with different flow rates.

The deflector may comprise one or more deflecting surfaces curvilinearly configured to direct the air in directions of travel in each of a plurality of desired different, non-parallel directions, the said plurality of non-parallel directions may comprise at least two orthogonal directions. Such orthogonal directions may for example comprise at least two orthogonal directions lying generally in or generally parallel to a plane generally substantially perpendicular to a radial direction of the engine, which radial direction is defined as generally orthogonal to the engine's longitudinal axis defined by the general direction of airflow through it. Further desirable and/or optional features of deflectors for use in such embodiments will be further defined and described hereinbelow.

The deflector may comprise one or more deflecting surfaces curvilinearly configured to direct the air in each of a plurality of desired different directions with different flow rates, the said plurality of different directions may for example comprise at least two directions lying generally in or generally parallel to a plane generally substantially perpendicular to a radial direction of the engine, which radial direction is defined as generally orthogonal to the engine's longitudinal axis defined by the general direction of airflow through it. Further desirable and/or optional features of deflectors for use in such embodiments will be further defined and described hereinbelow.

In accordance the distributor device may be for distributing cooling air within a gas turbine engine. However, it is envisaged that the invention may be extended to the distribution of cooling fluids in general, including cooling gases other than air, or even cooling liquids.

Furthermore, although the distributor device is applicable in particular to the distribution of cooling air within a gas turbine engine, it is envisaged the device may be used in any engine that utilises a cooling fluid such as air that requires distributing therewithin, especially within a space therein, such as within a manifold thereof. Examples of gas turbine engines in which the device may be usefully employed may include any of: turbofan engines, turbojet engines, turboprop engines and turboshaft or electric generator engines.

The distributor device may be employed in any part of such engines or manifolds thereof where the distribution or delivery of cooling air to particular or specific locations or regions therewithin is needed or desirable. Such locations or regions may for example be any locality or region in which an enhanced or improved level or uniformity of air delivery is wanted. Non-limiting examples include the delivery of cooling air to turbine vanes, or to one or more buffer air systems within a turbofan engine, such as in a HP-IP bearing hub, a tail bearing housing hub, and/or an intercase bearing.

In a second aspect there may be provided a manifold defining a space within a gas turbine engine for distribution therewithin of cooling air, the manifold comprising: at least one air inlet for delivering the cooling air into the space; and at least one respective distributor device according to the first aspect of the invention or any embodiment thereof for distributing the cooling air within the space.

Thus, there may be provided a manifold defining a space within a gas turbine engine for distribution therewithin of cooling air, the manifold comprising:

at least one air inlet for delivering the cooling air into the space; and at least one respective distributor device for distributing the cooling air within the space;

wherein the or each distributor device comprises:

a or a respective base mounted adjacent the or the respective air inlet;

a or a respective deflector supported by the or the respective base and in fluid communication with the or the respective air inlet, the or each respective deflector being configured to direct air from the or the respective air inlet in a or a respective plurality of directions within the space;

wherein the or each respective deflector comprises one or more respective deflecting surfaces curvilinearly configured to direct the said air differentially in a respective plurality of desired directions within the space.

Optional or preferred features of the distributor device of this second aspect may correspond to any of the optional or preferred features of the first aspect of the invention.

In a third aspect there may be provided a gas turbine engine comprising: a space for distribution therewithin of cooling air; at least one air inlet for delivering the cooling air into the space; and at least one respective distributor device according to the first aspect.

Thus, there may be provided a gas turbine engine comprising:

a space for distribution therewithin of cooling air;

at least one air inlet for delivering the cooling air into the space; and at least one respective distributor device for distributing the cooling air within the space;

wherein the or each distributor device comprises:

a or a respective base mounted adjacent the or the respective air inlet; and a or a respective deflector supported by the or the respective base and in fluid communication with the or the respective air inlet, the or each respective deflector being configured to direct air from the or the respective air inlet in a or a respective plurality of directions within the space;

wherein the or each respective deflector comprises one or more respective deflecting surfaces curvilinearly configured to direct the said air differentially in a respective plurality of desired directions within the space.

Optional or preferred features of the distributor device of this third aspect may correspond to any of the optional or preferred features any of the first aspect.

In a fourth aspect there may be provided a method of distributing cooling air within a space within a gas turbine engine, wherein: the engine comprises at least one air inlet for delivering the cooling air into the space; and the or each respective air inlet has provided thereadjacent a or a respective distributor device according to the first aspect of the invention or any embodiment thereof; wherein the method comprises: delivering air from the or each respective air inlet into the space via the or each respective distributor device, whereby the air is directed differentially in the said respective plurality of desired directions within the space.

Thus, the fourth aspect may provide a method of distributing cooling air within a space within a gas turbine engine, wherein:

the engine comprises at least one air inlet for delivering the cooling air into the space; and the or each respective air inlet has provided thereadjacent a or a respective distributor device for distributing the cooling air within the space;

wherein the or each distributor device comprises:

a or a respective base mounted adjacent the or the respective air inlet; and a or a respective deflector supported by the or the respective base and in fluid communication with the or the respective air inlet, the or each respective deflector being configured to direct air from the or the respective air inlet in a or a respective plurality of directions within the space;

wherein the or each respective deflector comprises one or more respective deflecting surfaces curvilinearly configured to direct the said air differentially in a respective plurality of desired directions within the space;

wherein the method comprises:

delivering air from the or each respective air inlet into the space via the or each respective distributor device, whereby the air is directed differentially in the said respective plurality of desired directions within the space.

Optional or preferred features of the distributor device in embodiments of the fourth aspect may correspond to any of the optional or preferred features the first aspect.

In a fifth aspect there may be provided a deflector element for use in forming the distributor device according to the first aspect.

Thus, the fifth aspect may provide a deflector element supportable by a base, the base being mountable adjacent an inlet for cooling air to be distributed within a gas turbine engine, and for fluid communication with the air inlet, the deflector element being configured to direct air from the air inlet in a plurality of directions within the engine, wherein the deflector element comprises one or more deflecting surfaces curvilinearly configured to direct, in use, the said air differentially in a plurality of desired directions within the engine.

Optional or preferred features of the deflector of the fifth aspect may correspond to any of the optional or preferred features of any deflector of any embodiment distributor devices defined herein.

The deflector of the distributor device may comprise one or more deflecting surfaces curvilinearly configured to direct air in each of a plurality of desired different, non-parallel directions of travel. The said plurality of non-parallel directions may comprise at least two orthogonal directions, for example at least two orthogonal directions lying generally in or generally parallel to a plane generally substantially perpendicular to a radial direction of the engine. Thus, in accordance with such first species embodiments the one or more deflecting surfaces may be curvilinearly configured such that air is directable smoothly and efficiently therefrom along a plurality of non-parallel axes preferably oriented generally substantially perpendicular to a radial direction of the engine, which radial direction is defined as generally orthogonal to the engine's longitudinal axis defined by the general direction of airflow through it. In some embodiments the said plurality of non-parallel axes may thus each be oriented generally substantially orthogonally to the direction in which the incoming air travels as it is delivered through the or the respective air inlet.

The one or more curvilinearly configured deflecting surfaces of the deflector may be curved in at least two planes which are non-parallel to one another, said planes being defined as (i) each being generally parallel to the direction of air flow from the or the respective air inlet and incident on the deflecting surface(s), and (ii) being angled with respect to one another at an angle of between 0° and 180°. That is to say, the one or more curvilinearly configured deflecting surfaces of the deflector may be curved in profile when viewed in cross-section taken along at least two such different planes.

The curved shape or profile of the deflecting surface(s) may be defined by a mathematical curve function selected from any of a circular or elliptical arc, a parabola, a hyperbola, a combination of any of the aforesaid functions, or any other suitable mathematical function. Thus, in any given such plane used to define the curved shape of the deflecting surface(s), the curve function may be substantially constant or it may vary along the length and/or height of the deflecting surface(s).

The deflector may comprise a substantially continuous curvilinearly configured deflecting surface extending therearound through substantially 360°.

The deflecting surface may have a uniform curvature or curve function substantially completely through 360° therearound, whereby air is directable substantially uniformly or equally in all directions therearound. Such species in which the deflecting surface has a substantially uniform curvature or curve function substantially completely therearound may be particularly useful for distributing or directing air uniformly therearound, e.g. with substantially equal flow rates in all directions therearound.

However, alternatively the deflecting surface may have a varying curvature or curve function at different angular positions or in different angular regions or segments therearound, whereby air is directable non-uniformly or non-equally in different directions therearound. Thus, the varying curvature or curve function at different angular positions or in different angular regions or segments around the deflector may be selected or tailored to direct air more favourably, e.g. with a relatively higher or lower flow rate, in certain selected one or more angular regions or segments surrounding the deflector than in other such angular regions or segments. In this manner it may thus be arranged that air is directable from the deflecting surface in one or more directions away from the distributor device with respective one or more different flow rates, with the flow rate in any given direction being dependent on the curvature function of the deflecting surface at the respective angular position corresponding to that respective direction. A deflecting surface which has a substantially non-uniform or varying curvature or curve function therearound may be particularly useful for distributing or directing air asymmetrically therearound, e.g. with relatively higher or lower flow rates in one or more particular desired directions therearound. This may be desirable for instance in arrangements in which the engine architecture is such that pipework or other components requiring e.g. cooling air to be directed thereto are arranged asymmetrically and so favour asymmetrical application of cooling air thereto in order to optimise the overall uniformity of the cooling effects of the distributed cooling air amongst the collective pipework or other components.

The deflector may comprise a substantially continuous, uniformly curved deflecting surface therearound such that an air-deflecting portion of the deflector has an exterior shape corresponding to that of a bell of a trumpet.

The base of the device may be constructed and/or arranged for mounting adjacent the or the respective air inlet. Conveniently the base may be constructed and/or arranged for mounting on a portion of a manifold at or in or around or adjacent to which the or the respective air inlet is provided for passage of air thereinto. In one example form the base may be constructed and/or arranged for mounting within, e.g. centrally or concentrically within, a mouth or exit aperture of the or the respective air inlet. Conveniently in this example form the base may itself be formed with an aperture or conduit therein for permitting passage therethrough of air from the or the respective air inlet towards and onto the deflecting surface(s) of the deflector.

If desired or necessary the base may comprise, or may be mounted on, a flange, e.g. an annular flange, for fixing or attachment or mounting on a portion of the engine or manifold thereof immediately around or adjacent the or the respective air inlet.

The base may comprise a tubular support, e.g. a cylindrical support, which may be fixed or attached or mounted within, e.g. centrally or concentrically within, the mouth or exit aperture of the or the respective air inlet. The deflector may be supported by the tubular support by virtue of being mounted thereon via one or more, preferably a plurality of, brackets, webs, ribs, vanes, struts, arms or other support elements. Any such brackets, webs, ribs, vanes, struts, arms or other support elements is/are preferably configured, shaped and/or positioned such that it/they do(es) not substantially interfere with or obstruct the passage of air from the or the respective air inlet towards and onto the deflecting surface(s) of the or the respective deflector.

The deflector may be supported by the tubular support via one or more, preferably a plurality of, brackets, webs, ribs, vanes, struts, arms or other discrete support elements, those brackets, webs, ribs, vanes, struts, arms or other discrete support elements may be substantially equiangularly positioned around the deflector.

The deflector may be supported by the tubular support via one or more, preferably a plurality of, brackets, webs, ribs, vanes, struts, arms or other discrete support elements, the deflector may conveniently comprise a central or axial spine constituting an anchoring portion onto which the plurality of support elements are mounted or attached, and from which the deflecting surface(s) of the deflector extend(s) with a gap between the said deflecting surface(s) and the tubular support for allowing passage therethrough of air undergoing distribution or directing having impinged on the or the deflecting surface(s).

The one or more brackets, webs, ribs, vanes, struts, arms or other discrete support elements may be substantially uniformly aligned with each other and all generally substantially parallel to the direction of flow of air from the air inlet towards and onto the deflecting surface(s) of the deflector. In other practical forms the one or more brackets, webs, ribs, vanes, struts, arms or other discrete support elements may each have a helical configuration, preferably with each helical support element being substantially parallel to its one or more immediately adjacent helical support elements(s). In this manner a degree of twisting or helical motion may be imparted to the air as it flows across and/or past the support elements in its passage from the or the respective air inlet towards and onto the deflecting surface(s) of the deflector.

The base may comprise a tubular support, e.g. a cylindrical support, which may be fixed or attached or mounted within, e.g. centrally or concentrically within, the mouth or exit aperture of the or the respective air inlet. The deflector may be supported by the tubular support by virtue of being mounted thereon via its peripheral edges or edge portions via one or more, preferably a plurality of, discrete peripheral struts, arms, brackets or other support elements. Any such discrete peripheral struts, arms brackets or other support elements is/are preferably configured, shaped and/or positioned such that it/they do(es) not substantially interfere with or obstruct the passage of air from the or the respective air inlet towards and onto the deflecting surface(s) of the deflector.

The deflector may be supported by the tubular support via one or more, preferably a plurality of, discrete peripheral struts, arms, brackets or other discrete support elements, those struts, arms, brackets or other discrete support elements may be substantially equiangularly positioned around the deflector. The said one or more, preferably a plurality of, discrete peripheral struts, arms, brackets or other discrete support elements may be substantially uniformly aligned with each other and all generally substantially parallel to the direction of flow of air from the or the respective air inlet towards and onto the deflecting surface(s) of the deflector.

The deflector may be supported by the tubular support via one or more, preferably a plurality of, discrete peripheral struts, arms, brackets or other discrete support elements, the deflector may conveniently comprise a peripheral land or annular rim or flange constituting an anchoring portion onto which the plurality of discrete peripheral support elements are mounted or attached. The respective discrete peripheral support elements may advantageously be separated by, or the material they are formed from may have formed therein, a plurality of apertures or windows which allow passage therethrough of air undergoing distribution or directing having impinged on the deflecting surface(s).

The deflector may be supported peripherally on the base, it may be that the deflector possesses no central or axial spine, and as a consequence it may conveniently be that the deflecting surface(s) of the deflector is/are spaced from the base with a gap therebetween, via which gap air passes from the or the respective air inlet towards and onto the deflecting surface(s) of the deflector.

The deflecting surface of the deflector may have a substantially uniform curvature or curve function substantially completely therearound may be particularly useful for distributing or directing air uniformly therearound, e.g. with substantially equal flow rates in all directions therearound.

The deflector of the distributor device may comprise one or more deflecting surfaces curvilinearly configured to direct air with different flow rates in a plurality of desired different directions.

The said plurality of desired different directions may comprise any two or more directions, including both non-parallel and parallel directions. Such two or more directions may lie generally in or generally parallel to a plane generally substantially perpendicular to a radial direction of the engine, which radial direction is defined as generally orthogonal to the engine's longitudinal axis defined by the general direction of airflow through it. Furthermore, as desired or as necessary, such two or more directions may be oriented at any desired angle(s) relative to each other, depending on the relative orientations of the airflows to be distributed by the deflecting surface(s) of the deflector. In some embodiments the said two or more directions may each be oriented generally substantially orthogonally to the direction in which the incoming air travels as it is delivered through the or the respective air inlet.

The purpose of directing air in each said different desired direction with a different flow rate, the deflector may comprise a plurality of deflecting surfaces each curvilinearly configured to direct air in a respective one of the said different directions with a respective different flow rate.

For the purpose of achieving or setting a particular desired flow rate, each respective deflecting surface may have its own unique curvature, which may for example be different from the curvature(s) of the other, or at least some of the other, deflecting surface(s). Thus, a first deflecting surface may have a first curvature and a second deflecting surface may have a second curvature, the second curvature being different from the first curvature. Similarly, for distributing air in three or more different directions, any third or subsequent deflecting surface may have a third or subsequent curvature, at least one of the third or subsequent curvatures being different from at least one or more of the first, second or other curvatures.

Alternatively or additionally, for the purpose of achieving or setting a particular desired flow rate, the respective deflecting surfaces may each be positioned asymmetrically or offset with respect to the or the respective air inlet. For this purpose the respective deflecting surfaces may be carried on a spine which is mounted asymmetrically or offset within or with respect to the or the respective air inlet, whereby airflow passing through the device is split asymmetrically into a plurality of discrete airflow sections, each with a different cross-sectional area and/or flow rate. In particular, where the distributor device is located within a mouth or exit aperture of a or a respective air inlet, the respective deflecting surfaces—or the spine carrying them— may for example be positioned in a chordal spatial position relative to the air inlet passageway.

The curvature of each respective deflecting surface may be selected or designed such that it is curvilinearly configured such that air is directed smoothly and efficiently therefrom in the respective desired direction at the respective desired flow rate characteristic of that respective deflecting surface. At least some of, and possibly all of, said plurality of desired different directions may each be along one of a plurality of axes preferably oriented generally substantially perpendicular to the radial direction of the engine, which radial direction is defined as generally orthogonal to the engine's longitudinal axis defined by the general direction of airflow through it. In some embodiments the said two or more directions may each be oriented generally substantially orthogonally to the direction in which the incoming air travels as it is delivered through the or the respective air inlet.

Each curvilinearly configured deflecting surface of the deflector may be curved in at least two planes which are non-parallel to one another, said planes being defined as (i) each being generally parallel to the direction of air flow from the or the respective air inlet and incident on the deflecting surfaces, and (ii) being angled with respect to one another at an angle anywhere in the range of from 0° up to 360°. That is to say, each curvilinearly configured deflecting surface of the deflector may be curved in profile when viewed in cross-section taken along at least two such different planes.

The curved shape or profile of each of the deflecting surfaces may be defined by a mathematical curve function independently selected from any of a circular or elliptical arc, a parabola, a hyperbola, a combination of any of the aforesaid functions, or any other suitable mathematical function. Thus, in any given such plane used to define the curved shape of each deflecting surfaces, the curve function may be substantially constant or it may vary along the length and/or height of the respective deflecting surface.

In practical example forms of distributor device, the deflector may be supported by the base, and/or the base may be mounted on or in the engine or manifold thereof, by any of the example constructional and/or configurational features defined hereinabove in the context of example forms.

By utilising distributor devices described herein various advantages may be achievable as compared with prior art arrangements in which no differential directing of cooling air in a plurality of desired directions within the engine is employed.

Within the scope of this application it is expressly envisaged that the various aspects, embodiments, examples and alternatives, and in particular the individual features thereof, set out in the preceding paragraphs, in the claims and/or in the following description and drawings, may be taken independently or in any combination. For example features described in connection with one embodiment are applicable to all embodiments, unless such features are incompatible.

BRIEF DESCRIPTION OF THE DRAWINGS

Embodiments of the invention will now be described, by way of example only, with reference to the accompanying drawings, in which.

DETAILED DESCRIPTION OF EMBODIMENTS

Figure 1:
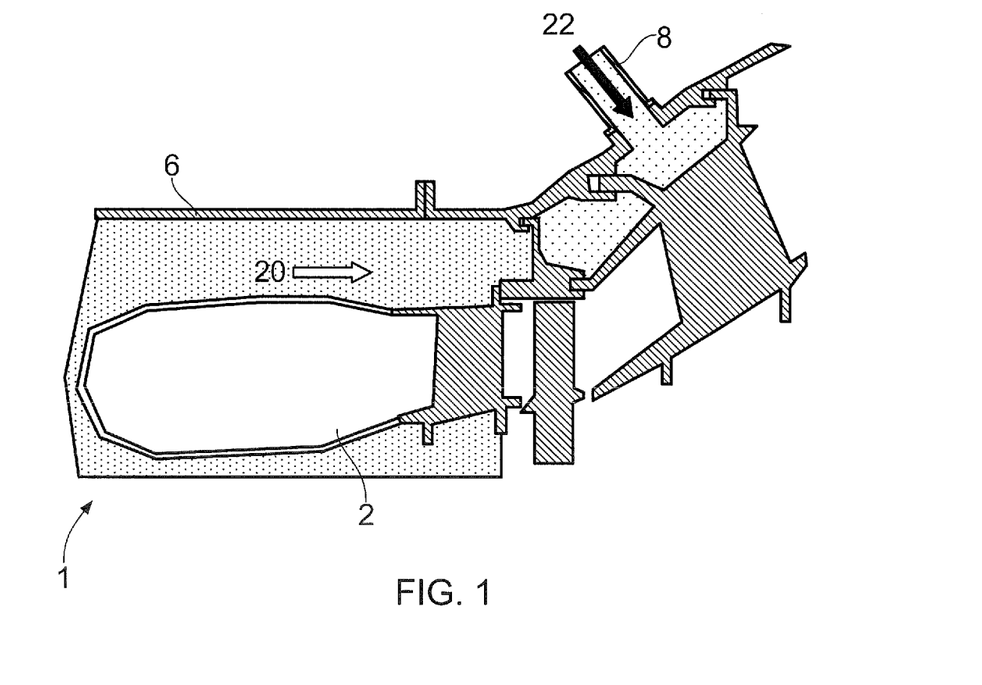
FIG. 1 is a cross-sectional schematic view of part of a typical single skin HP turbine of a turbofan engine, illustrating schematically part of the general layout of various cooling airflows.
Figure 2:
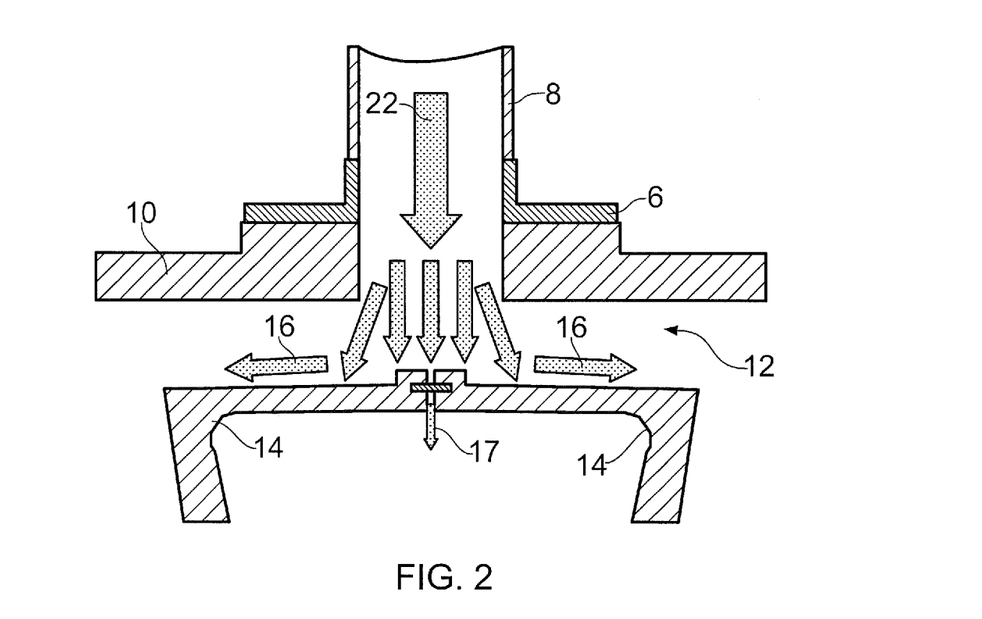
FIG. 2 is a cross-sectional schematic view of part of the turbine arrangement of FIG. 1, showing schematically an existing arrangement in which cooling air directly impinges on various components in the gaspath.

Referring firstly to FIGS. 1 and 2, FIG. 1 shows schematically in cross-section part of a typical single skin HP turbine 1 of a turbofan engine, illustrating schematically part of the general layout of various cooling airflows that are to be fed to particular sections of the engine 1. As shown by way of example, a feed flow 20 of HP6 air is used to cool components of a central engine core 2, whilst because of the relatively new use of a single-skin casing 6, a feed flow 22 of HP3 air from the HP compressor to the HP turbine is via large-bore pipework 8 routed around the outside of the central core 2.

FIG. 2 shows schematically in cross-section the upper right-hand portion of the engine shown in FIG. 1 where, according to a known prior art arrangement, the HP3 air is fed through the turbine casing 6 and into a manifold 10 defining a space 12 within the engine architecture in which cooling of internal components 14 is required. By way of example, such components 14 may include any of turbine vanes, NGV's, platforms, bearings, housings and/or hubs, but it is to be understood that any component(s) within any stage of the engine whose cooling may be required for safe and efficient operation thereof may be applicable here by appropriate layout and routing of the relevant pipework 8, and thus have embodiments of the present invention applied thereto. As illustrated schematically in FIG. 2, the known arrangement shown there is prone to problems associated with heat pick-up from gaspath components (such as at 16) and inter-component leakage (such as at 17).

FIGS. 3 and 6 show examples of distributor devices according to embodiments of the present invention, for distributing cooling air within a space defined within a turbofan or other gas turbine engine. Whilst these embodiments are described and illustrated with reference to distribution of air as a cooling fluid, it is to be understood that these and other embodiments may be applied to the distribution of one or more other cooling fluids within the engine, such as other gases, or even cooling liquids. It is also to be understood that these and other embodiments may be applied to the distribution of gaseous or liquid cooling fluid(s) in any space within any engine where delivery of such fluid(s) is required in particular desired directions within that space. By way of example, in the case of cooling air in a space defined by a manifold of a turbofan engine such as in the arrangement shown in principle in FIGS. 1 and 2, such desired directions may typically be in generally, or predominantly, circumferential and/or axial directions within the manifold and relative to the general longitudinal axis of the engine.

It is also to be understood that whilst the embodiment distributor devices of FIGS. 3 and 6 are being described and illustrated in terms of a single air inlet equipped with a single respective distributor device for directing the air delivered therethrough, in cases where one or more other air inlets are provided in the same, or even a different, region of the engine or manifold thereof, one or more respective like distributor devices—or even any other embodiment of distributor device according to the invention—may be employed for directing air delivered through that/those other one or more respective air inlet(s).

Referring now to FIGS. 3(*a*), (*b*), (*c*) and (*d*), which show a first embodiment of a distributor device in accordance with the invention, a manifold 110 of a turbofan engine 101 defines a space 112 within the HP-IP casing 106 into which cooling air 122, e.g. HP3 air, is to be distributed for cooling of components therein. An air inlet in the form of a cylindrical aperture, channel or conduit 130 is provided in a HP delivery pipe boss 132, e.g. with a planar outer face, mounted on or in the wall of the manifold 110. Mounted substantially centrally and concentrically within the air inlet 130 is air distributor device 150 which is according to this first embodiment of the invention and illustrated in further detail in FIGS. 3(*a*), (*b*), (*c*) and (*d*).

Figure 3A:
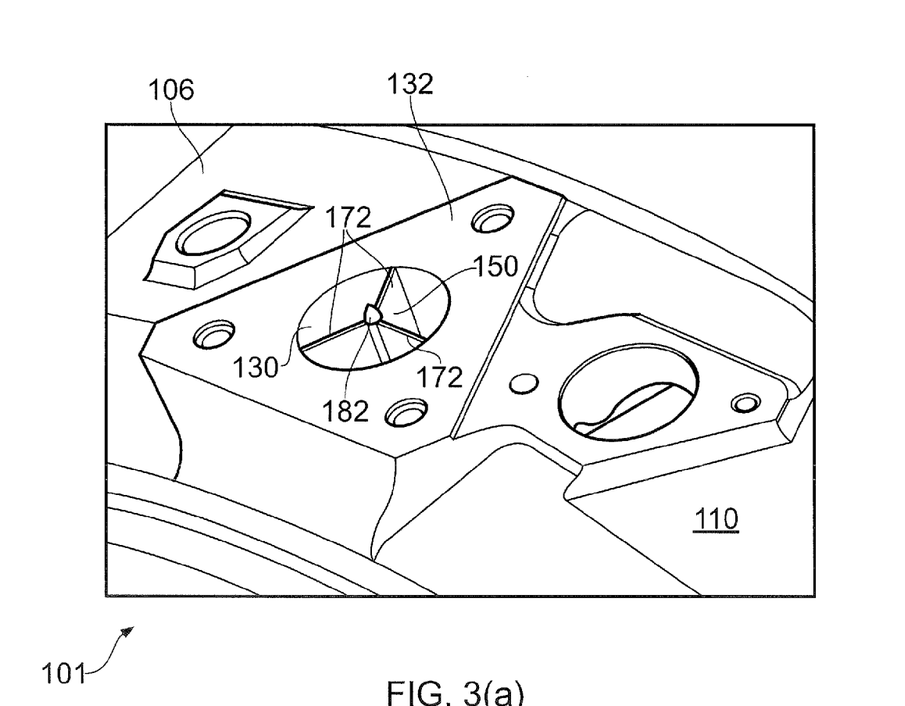
FIGS. 3(a), (b), (c) and (d) are, respectively, upper perspective, plan, lower perspective and cross-sectional views of a distributor device according to a first embodiment of the invention.
Figure 3B:
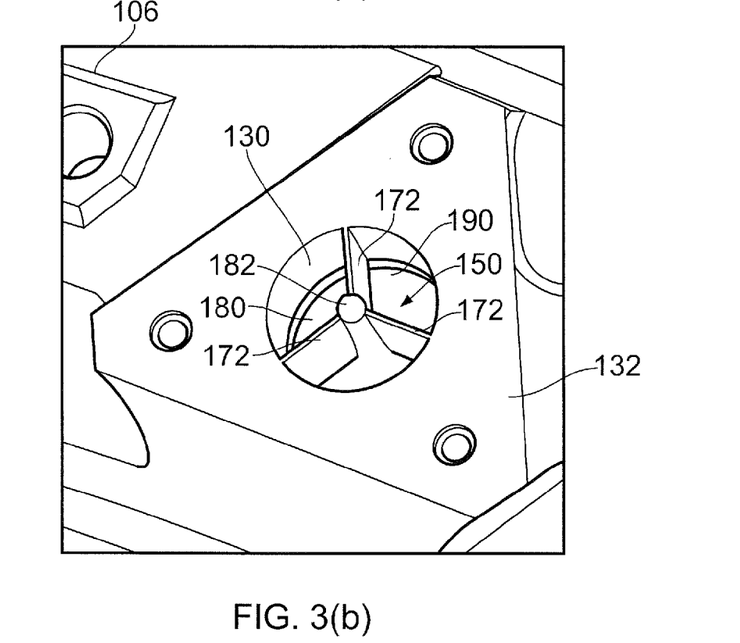
Figure 3C:
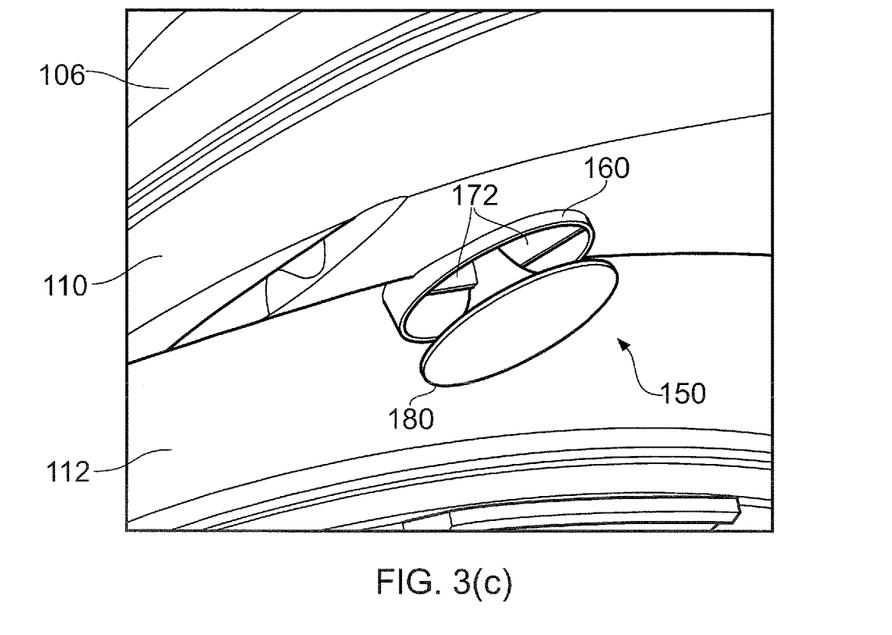
Figure 3D:
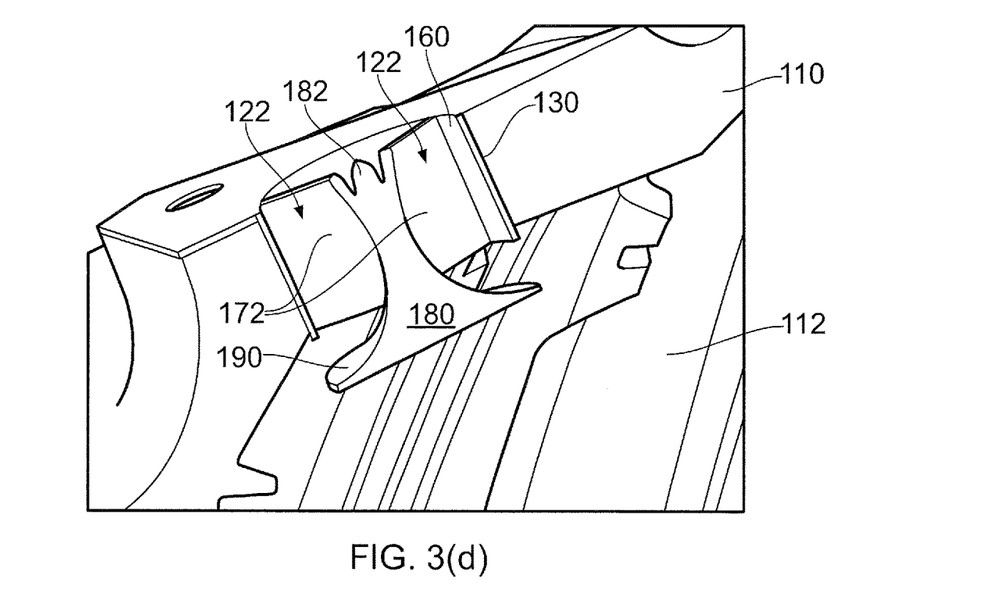

The air distributor device 150 comprises a cylindrical base 160 and an air deflector 180. The cylindrical base 160 is fixedly mounted within the mouth of the air inlet 130 by e.g. welding, optionally to a sealing gasket or flange (not shown) that sits between the boss 132 and the casing 106. The air deflector 180 is mounted within the cylindrical base 160 via an array of e.g. three (or other suitable number of) radially configured and/or positioned (i.e. radially relative to a longitudinal axis of the air inlet passage or conduit 130) mounting ribs or vanes 172. The mounting ribs or vanes 172 may be attached or fixed at their radially outermost ends to the interior walls of the air inlet 130 by e.g. welding or any other equivalent technique well-known in the art of engine manufacture. Likewise the radially innermost ends of the mounting ribs or vanes 172 may be attached or fixed to a central or axial spine 182 of the air deflector 180 by the same or like means. If desired, and as shown in FIG. 3(*d*), each mounting rib or vane 172 may be truncated, bevelled or chamfered at its axially (i.e. relative to the longitudinal axis of the air inlet passage or conduit 130) outermost end in a region adjacent the central or axial spine 182, in order to assist in the smoothing, and reduction of friction associated with, the passage of cooling air entering the distributor device 150 from the air inlet 130.

In this illustrated example embodiment the mounting ribs or vanes 172 are shown as all aligned parallel with one another and with the longitudinal axis of the air inlet passage or conduit 130, but it is to be understood that the mounting ribs or vanes 172 may if desired be shaped, configured and/or arranged helically in order to impart a degree of twisting or helical motion to the cooling air as it passes past and over the ribs or vanes 172 during its passage through the device 150. This latter feature may serve to further improve the distribution of the cooling air in the desired directions within the space 112.

The air deflector 180 which characterises this first embodiment of distributor device according to the invention comprises a deflecting surface 190 in the shape of the exterior of a bell of a trumpet. Thus, the deflecting surface 190 is rotationally substantially symmetrical about the longitudinal axis of air inlet 130 (and thus also the central axial spine 182 of the deflector 180). In other words, the deflecting surface 190 has a substantially uniform curved profile when viewed in all cross-sectional planes parallel to the said longitudinal axis of air inlet 130 (and thus the central axial spine 182 of the deflector 180). That curvature may for example be defined by a mathematical function representing a circular or elliptical arc, a parabola, a hyperbola, any combination of any of the aforementioned curve functions, or of any other suitable smoothly curved shape. The deflecting surface 190 may if desired be advantageously smoothed or polished in order to lower the frictional resistance experienced by cooling air passing over it.

An axially (i.e. relative to the longitudinal axis of the air inlet passage or conduit 130) lower portion 192 of the deflecting surface 190 of the deflector 180 is spaced from the axially innermost ends of the mounting ribs or vanes 172, and also the axially innermost end of the cylindrical base 160, so as to define between the axially lower portion 192 of the deflecting surface 190 and the said ribs or vanes 172 and cylindrical base 160 a gap for passage therethrough relatively unhindered of cooling air as it passes through the distributor device 150.

In use, as the cooling airflow exiting the air inlet 130 enters the distributor device 150 mounted in the mouth thereof, owing to the characteristic shape of the deflecting surface 190 the airflow is directed predominantly in all directions (through 360° about the longitudinal axis of air inlet 130 and thus also about the central axial spine 182 of the deflector 180) within the space 112, all said directions being substantially perpendicular to the said longitudinal axis of the air inlet 130. In other words, the said all directions in which the airflow is directed are all substantially circumferential or axial relative to the longitudinal axis of the engine and airflow passing through it. Thus, in this manner little or substantially no cooling air impinges in a radial direction (relative to the longitudinal axis of the engine) directly upon components lower down within the space 112, such as turbine vanes themselves, inter-vane gaps and strip seals therein. A more even and uniform of the cooling air within the space 112 therefore results, with lower propensity for localised hotspots and high thermal gradients to occur, thereby improving the thermal cooling characteristics of the cooling air and for example improving component operation and lifespan.

Figure 4:
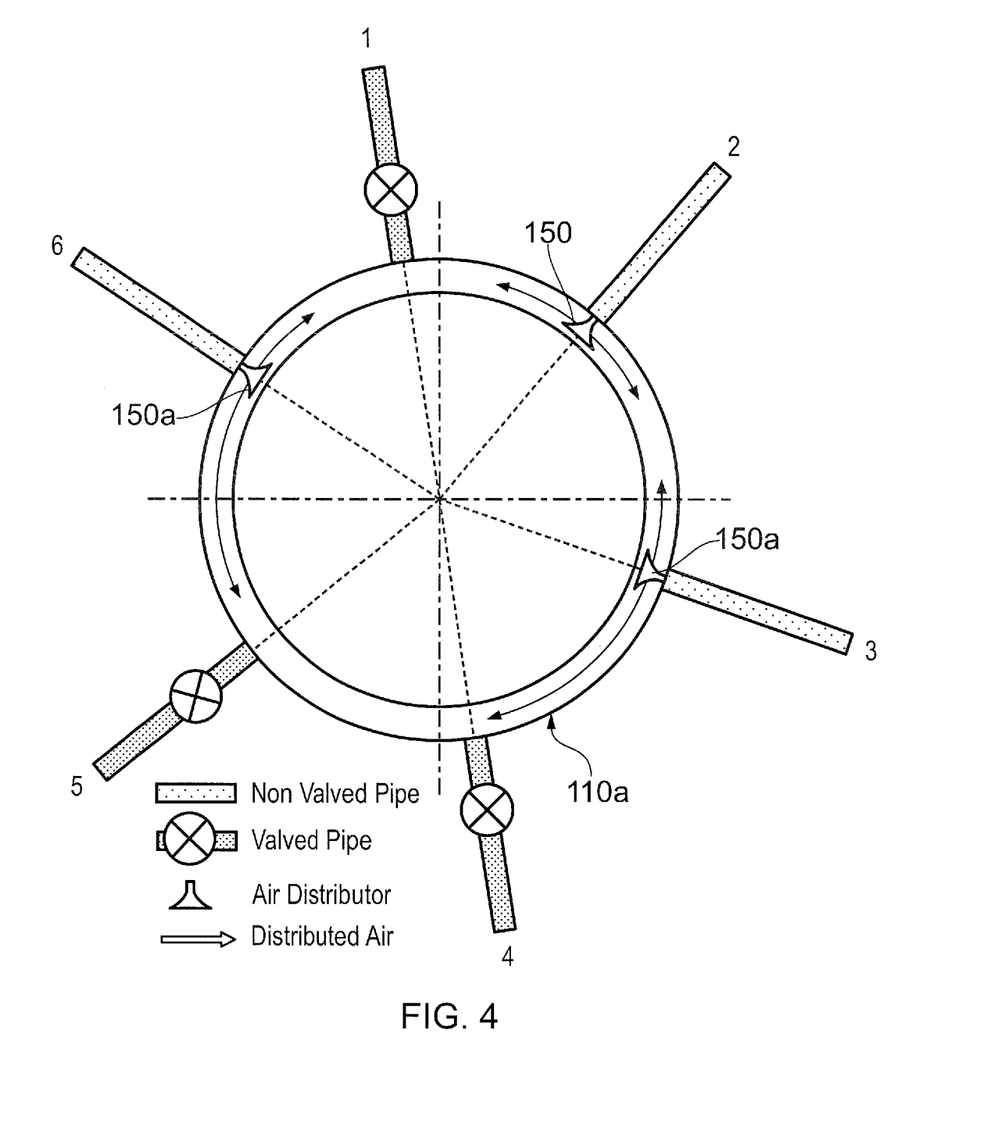
FIG. 4 is a schematic cross-sectional representation of the asymmetrical layout of valved and non-valved pipes feeding air into an engine manifold, in which the non-valved pipes are provided with modified respective distributor devices according to the first embodiment of the invention in order to generate asymmetrical airflows to the various regions within the manifold.

FIG. 4 illustrates one way in which the use of distributor devices of FIG. 3 may be used to good effect but in a modified form 150a in which the deflecting surface 190a has a varying curvature or curve function at different angular positions or in different angular regions or segments therearound, in order to direct cooling air non-uniformly or non-equally in different directions therearound. FIG. 4 represents the asymmetrical layout of valved and non-valved compressor off-take pipes feeding cooling air into an engine manifold 110a, in which the non-valved pipes nos. 2 and 6 are provided with respective modified distributor devices 150a. As shown, the air from all three non-valved compressor offtake pipes is re-directed predominantly circumferentially (relative to the longitudinal axis of the engine), yet in such a way that substantially no dead zones in the secondary air system are assured. This is achieved by designing the curvature function of the deflecting surface 190a of the modified distributor devices 150a such that it has a steeper or higher (or alternatively shallower or lower) gradient of curvature, and/or a different curve function altogether, in one or more selected angular regions or segments thereof, such that airflow in one or more respective selected directions corresponding to the said respective selected angular regions or segments occurs with a relatively higher or lower flow rate. In this manner greater (or lesser) airflow rates may be selectively directed in one or more desired directions around the distributor device, e.g. in order to increase the overall uniformity of the cooling effects of the airflow at different locations within the engine space 112a characteristic of the asymmetrical layout or spatial arrangement of the valved and non-valved pipes.

Thus in this modified embodiment the resulting arrangement is such that rotational asymmetry of the air deflector 180a provides an optimised asymmetrical airflow in different circumferential direction within the engine manifold 110a, as follows:

pipes 1, 4 & 5 are closed off by upstream valves;
pipe 2 directs cooling airflow equally towards pipes 3 and 6;
pipe 3 directs cooling airflow more (i.e. at a higher flow rate) towards pipe 4;
pipe 6 directs cooling airflow more (i.e. at a higher flow rate) towards pipe 5.

Figure 5A:
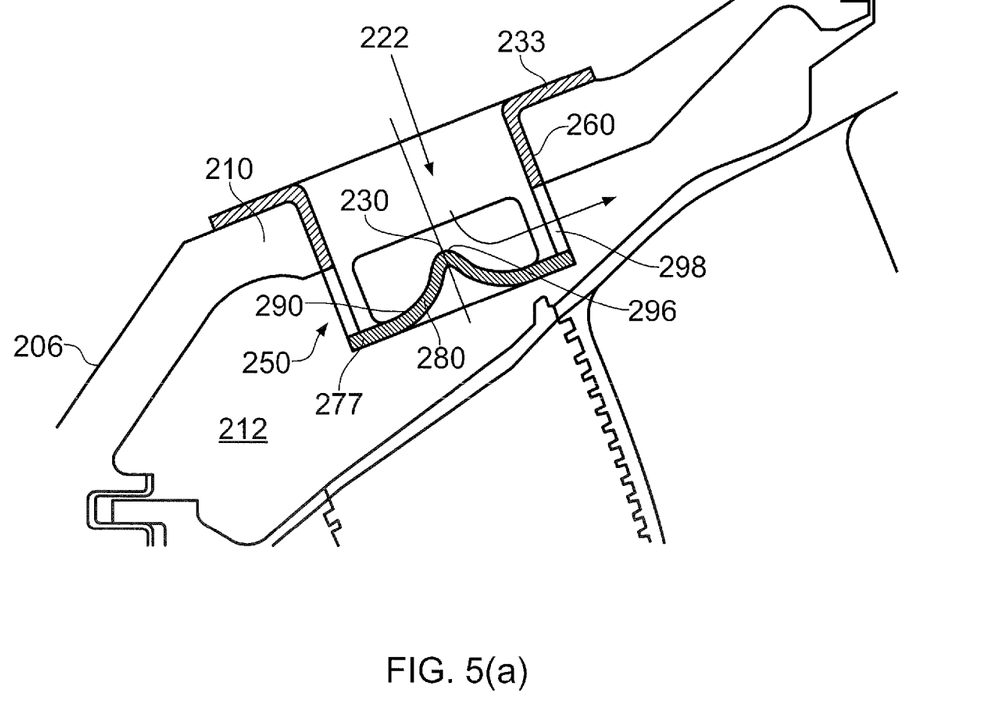
FIGS. 5(a), (b) and (c) are, respectively, cross-sectional, lower perspective and upper perspective views of a distributor device which is included for background information only.

Turning now to FIGS. 5(a), (b) and (c), these show an alternative configuration of a distributor device included for background information only. The features which correspond to features of the first embodiment distributor device of FIG. 3 are labelled with corresponding reference numerals but incremented by 100.

Figure 5B:
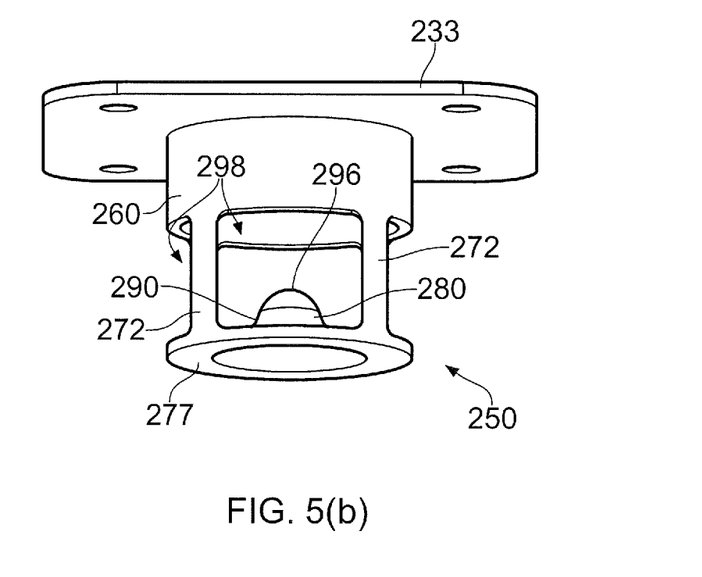
Figure 5C:
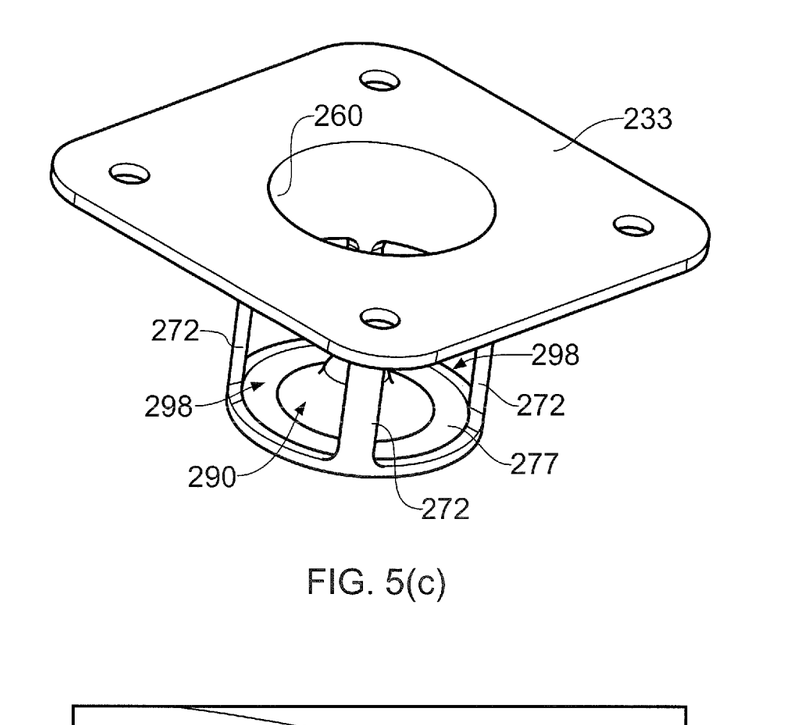

In FIGS. 5(a), (b) and (c) a manifold 210 of a turbofan engine 201 defines a space 212 within the casing 206 into which cooling air 222, e.g. HP3 air, is to be distributed for cooling of components therein. An e.g. cylindrical air inlet 230 is provided in a HP delivery pipe boss 232 in a corresponding manner to the air inlet 130 of the first embodiment of FIG. 3. Mounted substantially centrally and concentrically within the air inlet 230 is air distributor device 250.

The air distributor device 250 of this embodiment comprises a cylindrical tubular base 260 and an air deflector 280. The cylindrical base 260 is fixedly mounted within the mouth of the air inlet 230 by e.g. welding via an annular flange 233 (e.g. which may be square, circular, triangular or other polygonal shape) that lies against the casing 206 and is likewise welded thereto. The air deflector 280 is mounted via its periphery on the cylindrical base 260 via an array of e.g. four (or other suitable number of) axially configured and/or positioned (i.e. axially relative to the longitudinal axis of the air inlet 230) mounting struts or arm 272. The mounting struts or arms 272 are arranged equiangularly around the cylindrical base 260. They are attached or fixed at their radially outermost ends to the base 260, e.g. by welding or by being formed integrally therewith, and at their radially innermost ends to (likewise by welding or by being formed integrally therewith) an annular land or flange 277 which has attached thereto or carries the air deflector 280.

The air deflector 280 which characterises this distributor device comprises a deflecting surface 290 which may have substantially the same or a similar shape to the deflecting surface 190 of the first embodiment shown in FIG. 3. Thus, optional and/or desirable and/or preferred features of the deflecting surface 190 of that first embodiment deflector 180 apply also to the deflecting surface 290 of this deflector 280, so will not be reiterated here, for brevity.

However with the deflector 280, instead of the curved deflecting surface 290 extending all the way up to and merging with an axial spine of the deflector, which in this embodiment may be absent (especially since the deflector is mounted on the base via its periphery, not by radial ribs or vanes), it may usefully be shaped with a central region in the form of a convex dome or peak 296 which terminates at a distance from the lower edges of the cylindrical base 260 so as to define between the dome or peak 296 and the base 260 a gap for passage therethrough of cooling air as it flows through the device 250. The dome or peak 296 serves to facilitate the turning of the cooling air as it enters the device 250 from the inlet 230 and is directed into the desired directions by the deflecting surface 290. To allow or facilitate passage of cooling air out of the device once it has been directed into the desired direction by the deflecting surface 290, the walls of the cylindrical base 260 are provided, e.g. by post-production machining or cutting or integral forming, with apertures or windows 298 therein.

In use, given that the deflecting surface 290 of the deflector 280 may be substantially of the same curved shape as the deflecting surface 190 of the deflector 180 of the first embodiment as shown in FIG. 3, its function may likewise be correspondingly the same as in that first embodiment and as described above, so will not be reiterated here, for brevity.

Figure 6A:
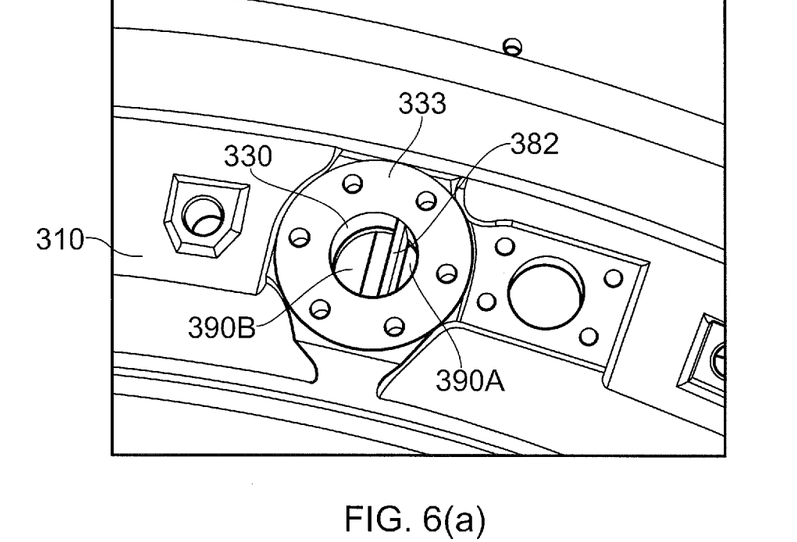
FIGS. 6(a), (b), (c), (d) and (e) are, respectively, plan, front perspective, lower perspective, front-on (from below), and side-on (from below) views of a distributor device according to a second embodiment of the invention.
Figure 6B:
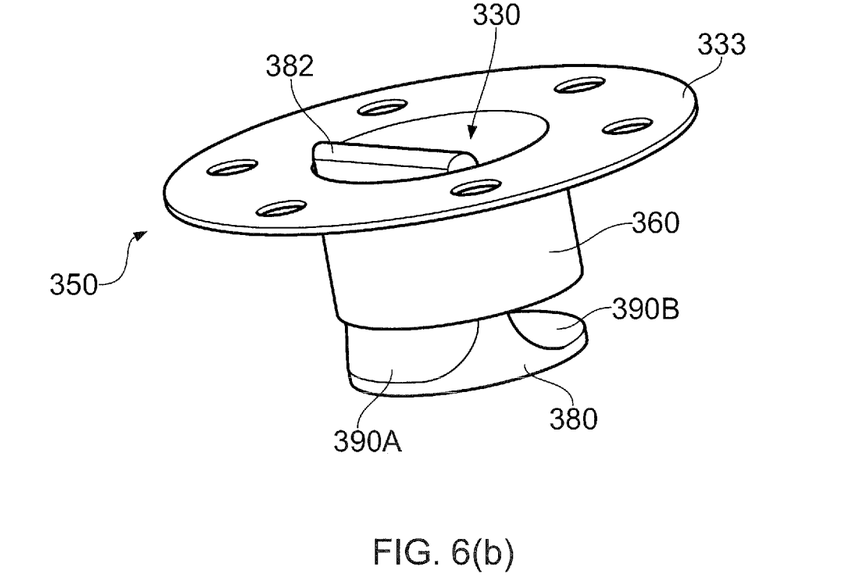
Figure 6C:
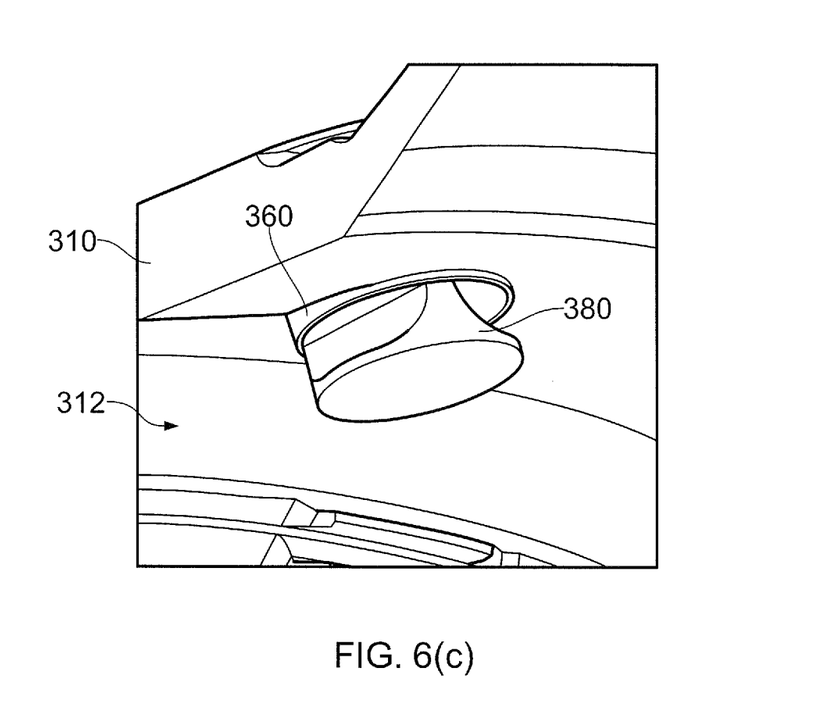
Figure 6D:
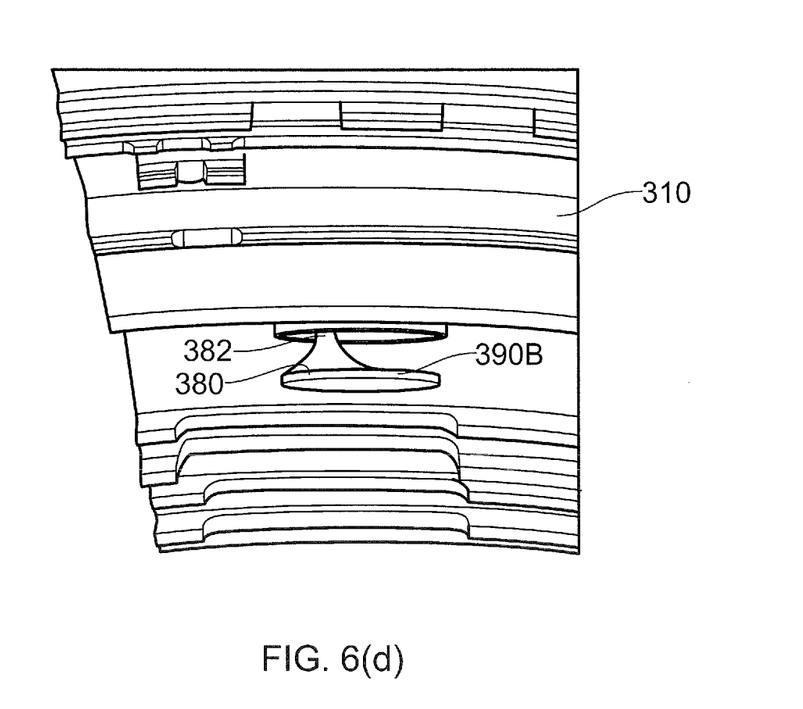
Figure 6E:
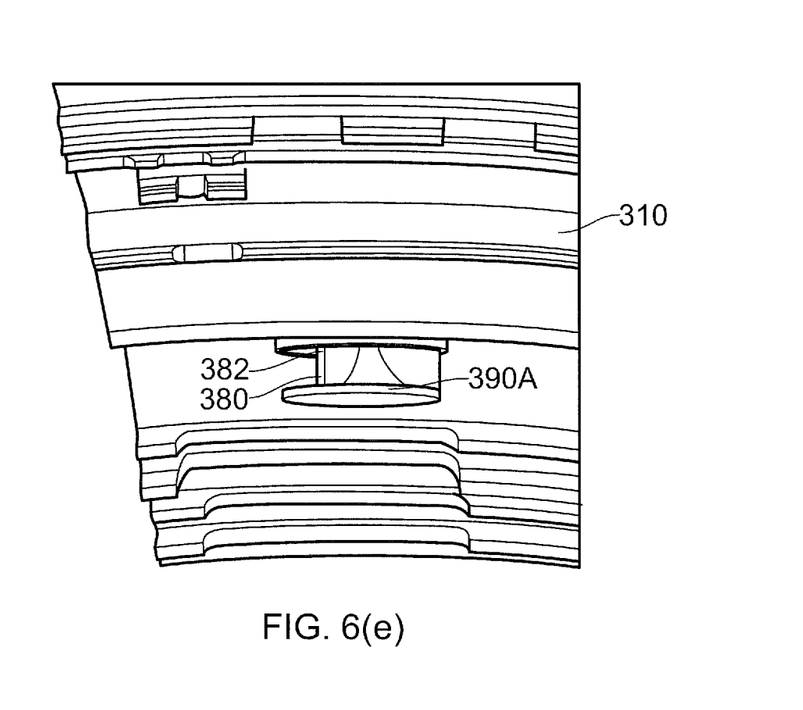

Turning now to FIGS. 6(a), (b), (c), (d) and (e), these show a second embodiment of a distributor device in accordance with the invention, in which features thereof which correspond to features of the first embodiment distributor device of FIG. 3 are labelled with corresponding reference numerals but incremented by 200.

In this second embodiment of distributor device 350, the deflector 380 is constructed and configured so as to bias the cooling airflow in one of two opposite directions with a higher (or lower) flow rate than in the other one of the two opposite directions, in order for example to account for asymmetrical air feed pipe distributions within the engine architecture.

In this second embodiment the general manner of mounting of the distributor device 350 on the engine manifold 310 within air inlet 330 substantially corresponds to that of the first embodiment of FIGS. 3 and 5, as will be readily appreciated and understood by persons skilled in the art. However, in this second embodiment the configuration and arrangement of the deflecting surface 390 of the deflector 380 is different.

As illustrated in FIGS. 6(a) to (e), in this second embodiment the deflecting surface 390 is split into discrete first 390A and second 390B oppositely facing deflecting surface portions, for the purpose of directing airflow in each of the two different desired directions with a different flow rate. For the purpose of achieving or setting a particular desired flow rate for each said direction, each respective deflecting surface portion 390A, 390B has its own unique curvature. That curvature of each respective deflecting surface portion 390A, 390B may be a unique or different one of a plurality of different mathematical functions, or values ascribed thereto, such as any of those used to define the curvatures of the deflecting surfaces of any of the first embodiment distributor devices of FIG. 3. Thus, in this illustrated example embodiment of FIG. 6, the first deflecting surface portion 390A may have a first curvature $C_A$ and the second deflecting surface portion 390B may have a second curvature $C_B$, the mathematical function which defines $C_A$ being different in form or ascribed values from that/those which define(s) $C_B$.

Although this second embodiment has been described and illustrated with reference to just two different directions and two unique curvatures of the respective deflecting surface portions 390A, 390B, it is to be understood that the same principle may be applied to the provision of other numbers of deflecting surface portions with their own unique curvatures and each for directing airflow in a unique desired direction with a given desired flow rate. Thus, a corresponding principle may be applied to three, four or even more different desired directions of distributed airflow, which may be provided by respective ones of three, four, etc discrete deflecting surface portions disposed appropriately angularly relative to one another around the deflector and each with an appropriate unique curvature function such as to impart or promote a rate of air flow characteristic of the respective direction in question that each deflecting surface portion is required to generate.

In the illustrated example in FIGS. 6(a) to (e) the first and second deflecting surface portions 390A, 390B terminate at their longitudinally (relative to the air inlet passageway 330) outermost ends by blending smoothly into a central spine 382, with which they are preferably integrally formed. The spine 382 is located within cylindrical base 360 (as seen more clearly in FIG. 6(b)) and is anchored therein, e.g. by welding of its sides or lateral edges, to the inner walls of the cylindrical base 360.

As also shown in FIGS. 6(a) to (e), alternatively or additionally for the purpose of achieving or setting a particular desired flow rate for each respective deflecting surface portion 390A, 390B, the respective deflecting surface portions 390A, 390B—or at least the spine 382 from which they extend—may each be positioned asymmetrically or offset within or with respect to the cylindrical base 360 and thus the or the respective air inlet 330. In particular, in example such second embodiments in which the distributor device 350 is located within the mouth or exit aperture of a or a respective air inlet 330, the spine 382 from which extend the respective deflecting surface portions 390A, 390B may for example be positioned in a chordal spatial position relative to the air inlet passageway 330. Thus, the spine 382 extends between, or spans a gap between, the side walls of the cylindrical base 360, and thereby partitions the available air inlet passageway 330 into two discrete airflow sections, each with a different cross-sectional area and/or a different air flow rate.

In use, given that the deflecting surface portions 390A, 390B of the deflector 380 of this second embodiment may in principle act in much the same way as the deflecting surface 190 of the deflector 180 of the first embodiment as shown in FIG. 3, their function may likewise be correspondingly the same as in that first embodiment and as described above, so will not be reiterated here, for brevity.

It is to be understood that the above description of embodiments and aspects of the invention has been by way of non-limiting examples only, and various modifications may be made from what has been specifically described and illustrated whilst remaining within the scope of the invention as defined in the appended claims.

Throughout the description and claims of this specification, the words "comprise" and "contain" and variations of the words, for example "comprising" and "comprises", mean "including but not limited to", and are not intended to (and do not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Furthermore, features, integers, components, elements, characteristics or properties described in conjunction with a particular aspect, embodiment or example of the invention are to be understood to be applicable to any other aspect, embodiment or example described herein, unless incompatible therewith.

The invention claimed is:

1. A distributor device for distributing cooling air within a gas turbine engine, the device comprising:
   a base mountable adjacent an inlet for air to be distributed; and
   a deflector supported by the base via a spine which is located within the air inlet and in fluid communication with the air inlet, the deflector being configured to direct air from the air inlet in a plurality of directions within the engine;
   wherein the deflector comprises one or more deflecting surfaces curvilinearly configured to direct the said air differentially in a plurality of desired directions within the engine,
   wherein the base comprises a tubular support which is mounted within a mouth of the or the respective air inlet, and the spine is supported within the tubular support by virtue of being mounted thereon via one or more support elements which extend between an inner surface of the tubular support and spine to provide a passage for a flow of cooling air from the inlet between the spine and tubular support and on to the curvilinearly configured deflecting surfaces of the deflector.

2. The distributor device according to claim 1, wherein the deflector comprises one or more deflecting surfaces curvilinearly configured to direct air in each of a plurality of desired different, non-parallel directions of travel.

3. The distributor device according to claim 2, wherein the one or more curvilinearly configured deflecting surfaces of the deflector is/are curved in at least two planes which are non-parallel to one another, said planes being defined as (i) each being generally parallel to the direction of air flow from the or the respective air inlet and incident on the deflecting surface(s), and (ii) being angled with respect to one another at an angle of between 0° and 180°.

4. The distributor device according to claim 1, wherein a said deflecting surface has a uniform curvature or curve function substantially completely through 360° therearound, whereby air is directable substantially uniformly or equally in all directions therearound.

5. The distributor device according to claim 1, wherein the one or more support elements include one or more brackets, webs, ribs, vanes, struts, or arms.

6. The distributor device according to claim 5, wherein the deflector comprises a central or axial spine constituting an anchoring portion onto which the plurality of support elements are mounted or attached, and from which the deflecting surface(s) of the deflector extend(s) with a gap between the said deflecting surface(s) and the tubular support for allowing passage therethrough of air undergoing distribution or directing having impinged on the or the deflecting surface(s).

7. The distributor device according to claim 5, wherein:
(i) a plurality of said brackets, webs, ribs, vanes, struts, arms or other support elements are substantially uniformly aligned with each other and all generally substantially parallel to the direction of flow of air from the air inlet towards and onto the deflecting surface(s) of the deflector; or
(ii) a plurality of said brackets, webs, ribs, vanes, struts, arms or other discrete support elements each have a helical configuration.

8. The gas turbine engine comprising:
a space for distribution therewithin of cooling air;
at least one air inlet for delivering cooling air into the space; and a distributor device for distributing cooling air within a gas turbine engine, the device comprising:
a base mountable adjacent an inlet for air to be distributed; and
a deflector supported by the base via a spine which is located within the air inlet and in fluid communication with the air inlet, the deflector being configured to direct air from the air inlet in a plurality of directions within the engine;
wherein the deflector comprises one or more deflecting surfaces curvilinearly configured to direct the said air differentially in a plurality of desired directions within the engine,
wherein the base comprises a tubular support which is mounted within a mouth of the or the respective air inlet, and the spine is supported within the tubular support by virtue of being mounted thereon via one or more support elements which extend between an inner surface of the tubular support and spine to provide a passage for a flow of cooling air from the inlet between the spine and tubular support and on to the curvilinearly configured deflecting surfaces of the deflector.

9. The distributor device for distributing cooling air within a gas turbine engine, the device comprising:
a base mountable adjacent an inlet for air to be distributed; and
a deflector supported adjacent the inlet via a spine which is at least partially located within the air inlet and in fluid communication with the air inlet, the deflector being configured to direct air from the air inlet in a plurality of directions within the engine;
wherein the deflector comprises one or more deflecting surfaces curvilinearly configured to direct the said air differentially in a plurality of desired directions within the engine,
wherein the base comprises a tubular support which is mounted within a mouth of the or the respective air inlet, and the spine is supported within the tubular support by virtue of being mounted thereon via one or more support elements which extend between an inner surface of the tubular support and spine to provide a passage for a flow of cooling air from the inlet between the spine and tubular support and on to the curvilinearly configured deflecting surfaces of the deflector.

10. The distributor device as claimed in claim 9, wherein the spine extends from a central portion of the deflector into the inlet.

11. The distributor device as claimed in claim 9, wherein the spine includes an anchoring portion onto which the one or more support elements are mounted or attached, and from which the deflecting surface(s) of the deflector extend(s) with a gap between the said deflecting surface(s) and the inlet for allowing passage therethrough of air undergoing distribution or directing having impinged on the or the deflecting surface(s).

12. The distributor device as claimed in claim 11, wherein the support elements include one or more of brackets, webs, ribs, vanes, struts, arms or other discrete support elements.

13. The distributor device as claimed in claim 12, wherein the support elements are substantially aligned with each other and are generally parallel to the direction of flow of air from the air inlet towards and onto the deflecting surface(s) of the deflector.

* * * * *